(12) United States Patent
Willin et al.

(10) Patent No.: US 8,255,301 B1
(45) Date of Patent: Aug. 28, 2012

(54) DEBT CANCELLATION MECHANISM

(75) Inventors: Courtland A. Willin, Media, PA (US);
Eric H. H. Choltus, Charlotte, NC (US);
Robert M. Mauldin, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 434 days.

(21) Appl. No.: 11/843,002

(22) Filed: Aug. 22, 2007

(51) Int. Cl.
*G06Q 40/00* (2012.01)
(52) U.S. Cl. .......................... 705/35; 705/38
(58) Field of Classification Search ............ 705/35, 705/38
See application file for complete search history.

(56) References Cited

U.S. PATENT DOCUMENTS

| | | | | |
|---|---|---|---|---|
| 4,953,085 | A * | 8/1990 | Atkins | 705/36 R |
| 6,315,196 | B1 * | 11/2001 | Bachman | 235/380 |
| 2005/0289044 | A1 * | 12/2005 | Breslin et al. | 705/38 |
| 2007/0239493 | A1 * | 10/2007 | Sweetland et al. | 705/4 |
| 2008/0235063 | A1 * | 9/2008 | Kasower | 705/4 |

OTHER PUBLICATIONS

Reilley, Bod. (Oct. 2001). Debt Cancellation: the preferred alternative to credit insurance. ABA Banking Journal.*
Perkins, Broderick. (Nov. 30, 2001). Business Journal. "New Mortgage insurance protects homeowners against job loss."*
Consumer Credit Insurance Association Says Holiday Credit Use Headed for $120 Billion Puts Focus on Debt Protection. (Dec. 2). Business Wire,1. Retrieved May 31, 2012.*

* cited by examiner

*Primary Examiner* — Kito R Robinson
(74) *Attorney, Agent, or Firm* — Banner & Witcoff, Ltd.; Michael A. Springs

(57) ABSTRACT

A method of debt cancellation is described. Occurrence data representative of an occurrence of a triggering event on a customer is received. A current benefit amount associated with the customer is determined, and a current amount of debt in the account of the customer is determined. A determination is made as to whether the current amount of debt in the account of the customer is less than the current benefit amount associated with the customer. The current amount of debt in the account of the customer may then be canceled to zero, and a new current benefit amount associated with the customer is maintained as the difference between the current benefit amount and the current amount of debt in the account of the customer prior to canceling.

24 Claims, 4 Drawing Sheets

DEBT CANCELLATION MECHANISM

BACKGROUND

In the financial industry, like many others, maintaining customers in a competitive environment is important. To remain competitive, many entities institute programs and products in attempts to attract new customers and to retain the current customers they have. Such programs and products include a special interest rate on a debt associated with an account of the entity, an insurance package offered to a customer that has an account that exceeds a threshold debt, in addition to other types of programs and products.

Therefore, there exists a need in the art for new customer incentive products and packages that assist financial institutions in maintaining existing customers and growing a base of new customers.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a method and system for debt cancellation. The method provides for maintaining a plurality of accounts associated with a plurality of customers of an entity. Occurrence data representative of an occurrence of a triggering event associated with a debt cancellation program of the entity and customer data representative of a customer associated with the occurrence data are received. A current benefit amount associated with the customer is determined. A determination is then made as to whether the customer is eligible for cancellation of debt associated with an account of the customer. Upon determining the customer is eligible, a current amount of debt in the account of the customer is determined. Another determination then is made as to whether the current amount of debt in the account of the customer is less than the current benefit amount associated with the customer. Upon determining if the current amount of debt in the account of the customer is less than the current benefit amount associated with the customer, the current amount of debt in the account of the customer is canceled to zero. A new current benefit amount associated with the customer is maintained as the difference between the current benefit amount and the current amount of debt in the account of the customer prior to canceling.

Another aspect of the present invention is directed to periodically determining whether an account of a customer is eligible for an increase in a benefit amount. Upon determining if the account of the customer is eligible, the benefit amount associated with the customer may be increased. Still another aspect of the present invention is directed to maintaining event data representative of a plurality of triggering events associated with a debt cancellation program of an entity and maintaining current benefit amount data representative of current benefit amounts associated with the debt cancellation program for a plurality of customers.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
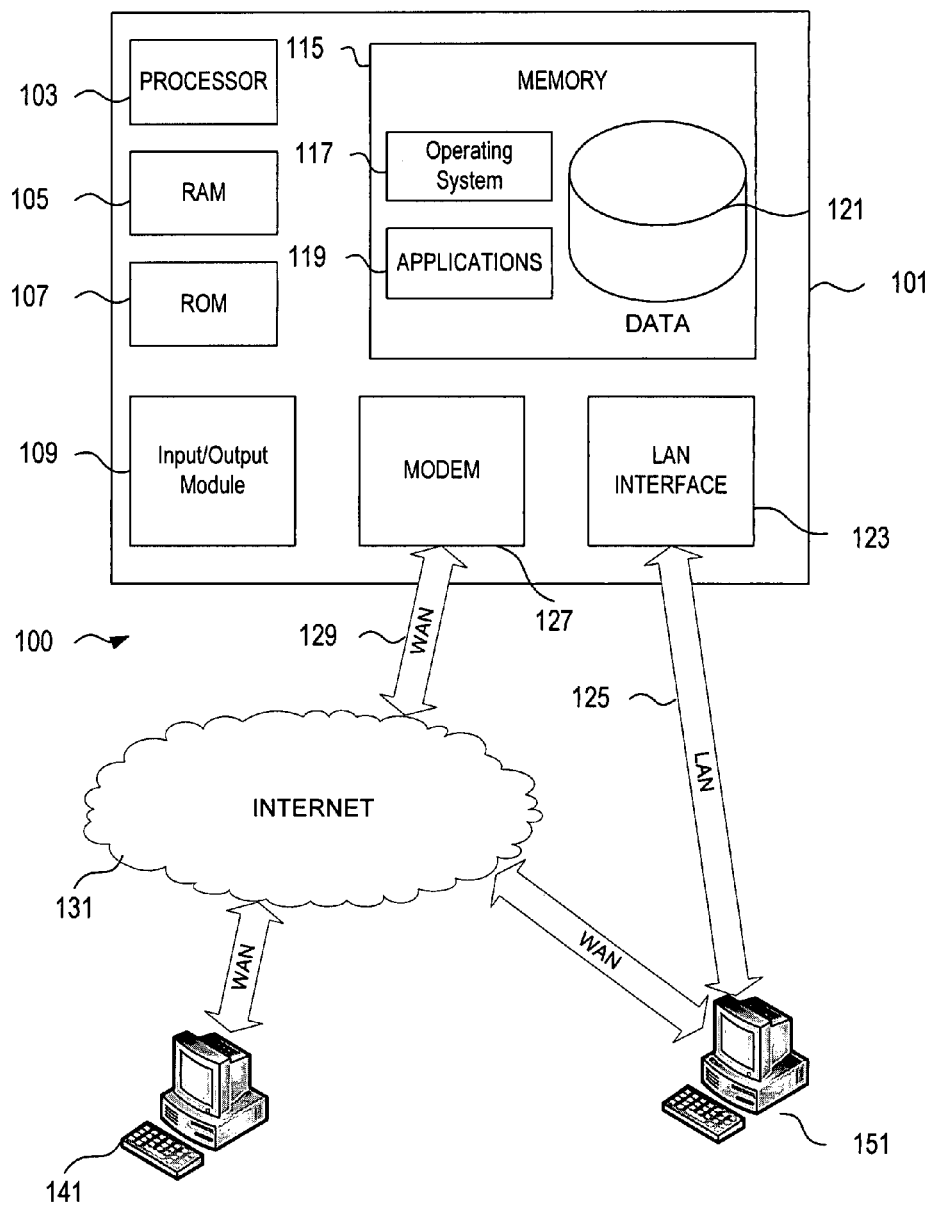
FIG. 1 illustrates a schematic diagram of a general-purpose digital computing environment in which certain aspects of the present invention may be implemented.

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
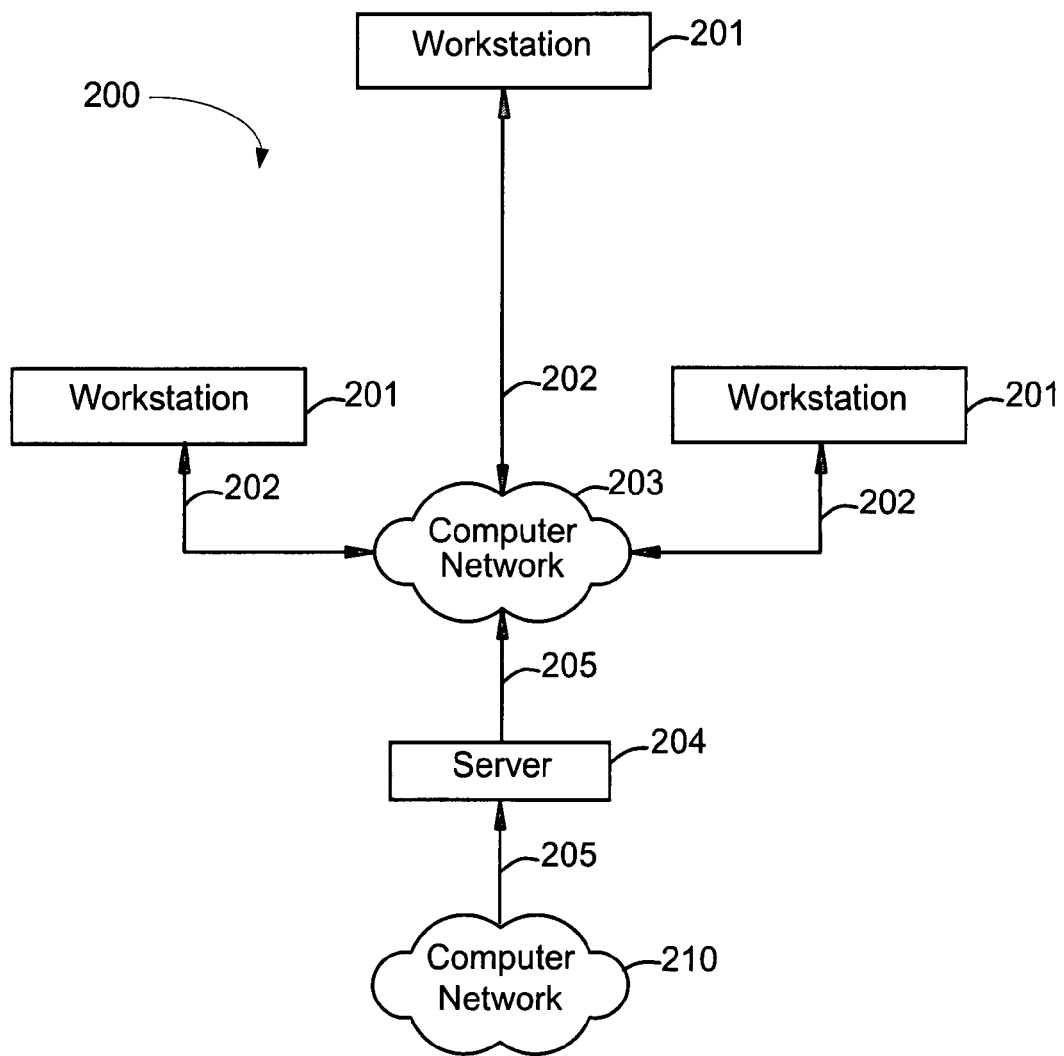
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
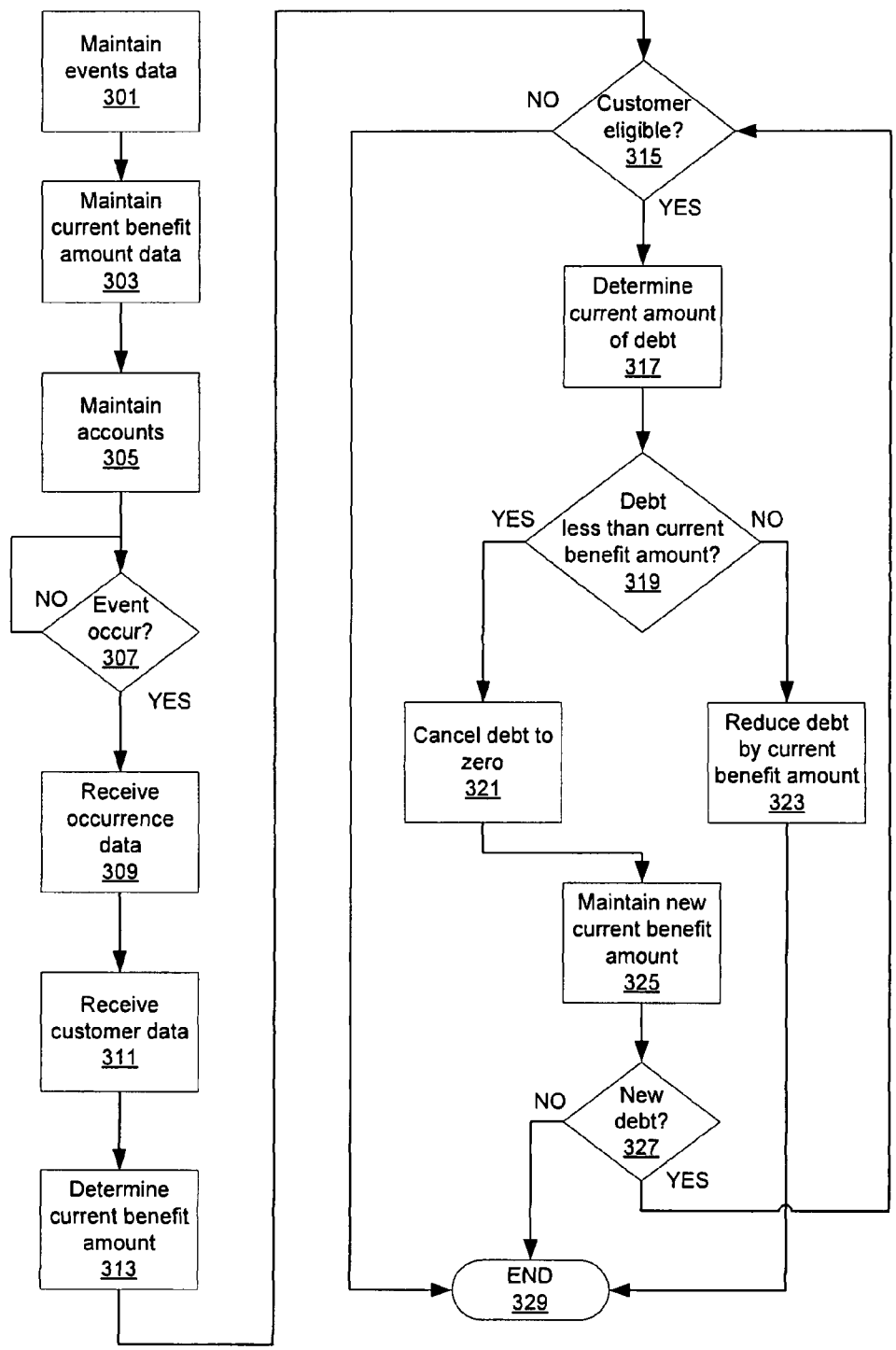
FIG. 3 is an example flow chart of an illustrative method for providing a debt cancellation service in accordance with at least one aspect of the present invention.

FIG. 3 is an example flow chart of an illustrative method for providing a debt cancellation service in accordance with at least one aspect of the present invention. As understood by those skilled in the art, the steps that follow in FIG. 3 may be implemented by one or more of the components in FIGS. 1 and 2 and/or other components, including other computing devices.

Aspects of the present invention describe a debt cancellation service or product that protects a customer and their family that has an account with an entity from a sudden loss of income and/or special event that occurs. The product or service may be optional and may be designed to provide a predefined total benefit amount in debt cancellation on the account of the customer. For example, the product may be affiliated with a credit card of the customer and may make up to $3000 in payments on the customer's credit card in accordance with one or more aspects described herein. The product or service may be offered to customers for a nominal fee, such as a monthly fee that does not change. For each month of coverage of the event, the product or service may provide a predefined benefit amount of the total benefit amount on the account of the customer.

A triggering event that initiates the payment on the account of the customer may be any of a number of predefined events. In addition, the time period of coverage may be any time period and the illustrative examples described herein are not limiting. In one embodiment, triggering events for payments may include involuntary unemployment of the customer or a spouse of the customer. In such an example, the product may offer six months of coverage. In that example, upon validating the involuntary employment status, the product or service makes a payment of $500 each month on the customer's credit card debt. If the debt on the credit card account is less than $500, the product or service makes a payment to cancel the debt to zero and then defers any remaining amount for future debt that may accumulate on the credit card account.

Other examples of triggering events may include a need for family leave, such as a customer that must tend to an ailing parent for an extended period of time, disability of the customer or spouse of the customer, a marriage of the customer, a divorce of the customer, a birth of a child by the customer, and an adoption of a child by the customer. Still other types of triggering events may include a retirement of the customer or spouse of the customer, entering into or graduating from a college or post graduate school by the customer or member of the customer's family, academic excellence by the customer or a member of the customer's family, a death of the customer or a member of the customer's family, and a hospitalization of the customer or member of the customer's family. As should be understood, these are but illustrative examples of triggering events and any of a number of other types of triggering events may be included within the product or service.

With respect to these triggering events, any number of different coverage periods may be implemented in accordance with one or more aspects of the present invention. For example, a triggering event that may be thought to have a more profound impact on the income of a customer may have a longer coverage period. For example, if the triggering event is involuntary unemployment, the coverage period may be set for six months. In the alternative, if the triggering event is the fact that the customer is moving, the coverage period may only be set for one month as such an event would likely have less of an impact on the financial life of the customer. However, as should be understood, any number of different coverage periods may be utilized for a triggering event. In addition, a type of triggering event may have different levels of coverage periods. For example, the birth of a single child may have a coverage period set for one month, while the birth of twins or triplets may have a coverage period set for two or three months.

In accordance with other aspects of the present invention, more than one triggering event may occur at the same time. For example, while expecting the birth of a child, a customer may decide to move to a larger home. As such, the customer may trigger two separate events, a moving event and a childbirth event. In such a situation, the product or service may be configured to allow for a maximum monthly payout for an event, such as $500, be paid out twice in one month. Therefore, if an account of the customer, such as a credit card, has a debt of $1500 at the time of the triggering events, $1000 of the debt may be canceled by the product or service in one month, $500 for the moving triggering event and $500 for the childbirth triggering event. In still other examples, the product or service may only be configured to permit one triggering event to occur at a time.

As should be understood, the balance on the account of the customer will never fall below zero based upon payments made by the product or service. The product or service described herein is not a loan or line of credit. It is a payment on a debt that will not have to be paid back by the customer to the entity that offers the product or service. During a benefit period, the customer is free to continue to incur debt associated with the account, such as in the case of a credit card. For customers with a debt of less than the benefit amount, such as $500, the credit card is paid to a zero balance and the remainder of the $500 is deferred until a balance does exist that can be paid. The deferral period may be predefined to expire, such as after twelve months.

As such, if a customer has a debt of $150 on an account and the customer triggers an event, a payment to cancel the $150 debt on the account of the customer is made by the product or service in one month. A deferred amount of benefit of $350 is then maintained for that customer. Then, if the customer incurs a debt on the account of $400 the next month, the product or service pays the lesser of the remainder of the benefit amount, $350 in this example, or an amount to cancel the debt to a zero balance, which is $400 in this example. Therefore, in this example, the customer has a $50 debt associated with the account after the deferred payment is exhausted.

The account may be with respect to any of a number of financial products or services, including, but not limited to, a credit card, a home equity loan, an automobile or other vehicle, such as a motorcycle, a boat, or an all terrain vehicle, payment plan, and a mortgage. Other types of products or services offered by an entity may utilize one or more aspects of the present invention and the illustrative examples described herein are not limiting.

Returning to FIG. 3, the process starts and at step 301, event data representative of a plurality of triggering events associated with a debt cancellation program of an entity may be maintained. In such an example, the event data may be stored within a memory/database such as memory 115 and/or RAM 105 in FIG. 1. As described above, any number of different types of triggering events may be designated, such as the birth of a child, a sudden loss of employment, or a death in the family. Event data may include an amount of coverage time for each triggering event. Proceeding to step 303, current benefit amount data representative of current benefit amounts associated with the debt cancellation program for a plurality of customers may be maintained. Again, in such an example, the current benefit amount data may be stored within a memory/database such as memory 115 and/or RAM 105 in FIG. 1. Current benefit amount data may include the default time period of coverage per triggering event, a default total benefit amount of the debt cancellation program offered to all eligible customers, and a monthly maximum benefit amount for a triggering event.

Proceeding to step 305, a plurality of accounts associated with the plurality of customers of the entity may be maintained. In such an example, data of the accounts may be stored within a memory/database such as memory 115 and/or RAM 105 in FIG. 1. In step 307, the process waits for a triggering event to occur. Once a triggering event, such as involuntary unemployment of the customer, occurs, the process proceeds to step 309. In step 309, occurrence data representative of an occurrence of a triggering event associated with a debt cancellation program of the entity may be received. The occurrence data may be a phone call from the customer, it may be an entry through a graphical user interface associated with a web site of the entity, and it may be a facsimile or other written data as well. Moving to step 311, customer data representative of a customer associated with the occurrence data may be received. The customer may be one of the plurality of customers that has one or more accounts with the entity.

In step 313, a current benefit amount associated with the particular customer identified from the customer data is determined. If the customer has recently utilized the program with another triggering event, the current benefit amount may be less than a starting or default benefit amount. A determination is then made in step 315 as to whether the customer is eligible for cancellation of debt associated with an account of the customer with the entity. Such a determination may be based upon a number of variables. In one example, the system may determine whether the customer is even enrolled in the debt cancellation program at all. If not, the process ends at step 329. In another example, a customer may call a hotline to indicate that she has just recently adopted a child, but may fail to provide any type of proof, such as adoption papers, birth certificate, and/or social security card of the newly adopted child. In such an example, the customer may not be eligible to receive the benefit and may be outright denied.

The determination in step 315 also may be based upon whether proof exists to show that the triggering event has occurred. For example, the customer may be required to present some form of data representative of proof of the occurrence of the triggering event. In one example, a customer may have to provide a copy of a receipt from a state unemployment office showing filing of paperwork regarding an involuntary unemployment status. In another example, for a birth of a child of a marriage by the customer, the customer may be required to provide documentary proof of a birth certificate or marriage certificate, respectfully. As should be understood by those skilled in the art, any number of different types of certifying documents may be required and may be specified by an entity in advance.

If a customer is deemed eligible in step 315 and the proof has been validated by the system to allow the benefit to take effect, the process moves to step 317 where a current amount of debt in the account of the customer may be determined. In the example of a credit card account, the system may determine a current balance on the credit card account. In step 319, a determination may be made as to whether the current amount of debt in the account of the customer is less than the current benefit amount associated with the customer.

For example, a customer may have a current amount of debt of $800 on her credit card and have a current benefit amount of $500. In such an example, the determination in step 319 would be that the current amount of debt in the account of the customer is not less than the current benefit amount associated with the customer and the process moves to step 323. In step 323, the current amount of debt in the account of the customer may be reduced by the current benefit amount. In this example, $500 of the debt in the credit card account of the customer would be canceled and the new debt would be only the remaining $300. From step 323, the process may end at step 329.

Returning to step 319, if the current amount of debt in the account of the customer is less than the current benefit amount associated with the customer, the process moves to step 321. In step 321, the entire current amount of debt in the account of the customer is reduced to zero. As such, a remainder of the difference between the current benefit amount and the amount of debt prior to cancellation exists. Therefore, proceeding to step 325, a new current benefit amount, representative of this difference, may be maintained by the system. As previously described, the new current benefit amount data may be stored in a database or other type of memory for future use as needed by the customer in the event of another triggering event and/or another month or other time period in the coverage period of the triggering event.

Moving to step 327, a determination is made as to whether a new amount of debt in the account of the customer exists. Such may be the case when the customer charges more expenses on her credit card account. If no new debt occurs, the process may end at step 329. If new debt does exist on the account of the customer, the process may return to step 315 where a new determination is made as to whether the customer is eligible for cancellation of debt associated with the account of the customer with the entity. As previously described, the system may cancel the new debt on the account of the customer up to the amount of the remaining benefit amount, i.e., the new current benefit amount. If the new debt is still less than the remaining benefit amount, the debt is again canceled to zero, such as in step 321, and a new current benefit amount of any remainder is again maintained, such as in step 325. In the alternative, if the new debt exceeds the new current benefit amount, the new debt is reduced by the amount of the new current benefit amount, such as in step 323.

Figure 4:
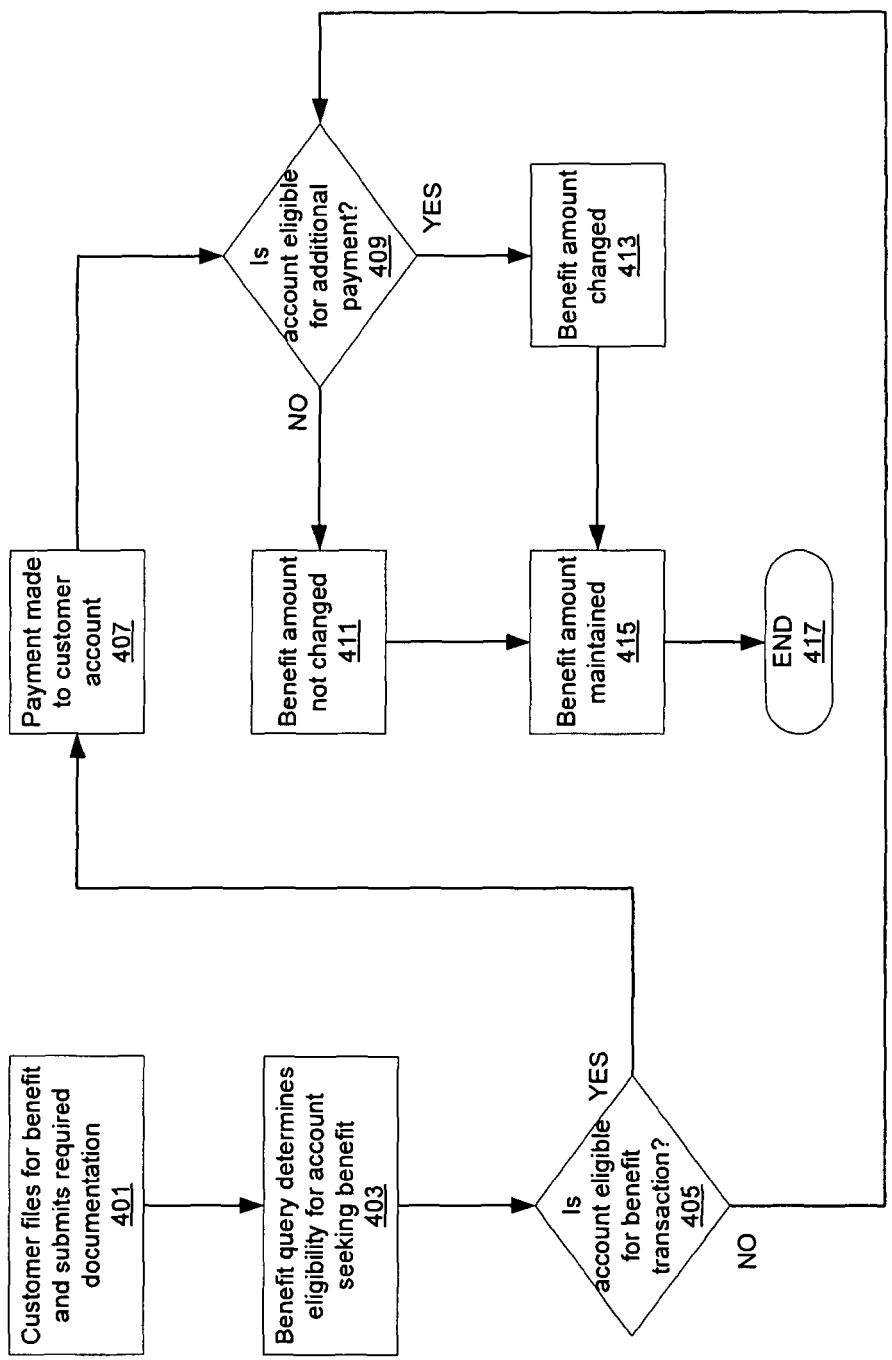
FIG. 4 is an example flow chart of an illustrative method for handling a benefit request in accordance with at least one aspect of the present invention.

FIG. 4 is an example flow chart of an illustrative method for handling a benefit request in accordance with at least one aspect of the present invention. The process starts at step 401 where a customer may file for a benefit due to a triggering event and may submit the required documentation and/or other information/data for proof of the occurrence of the triggering event. As previously described, in one example, for the birth of a new child, the customer may be required to submit a copy of the birth certificate.

In step 403, a benefit query component of the system may determine the eligibility for the customer account that is seeking the benefit. Proceeding to step 405, a determination is made as to whether the account is eligible for a benefit transaction to occur for the customer. If the account is not currently eligible, the process proceeds to step 409. If the account is eligible in step 405, the process moves to step 407.

In step 407, a payment may be made to the account of the customer. As previously described with respect to FIG. 3, the debt in the account of the customer may be canceled to the lesser of zero and the current benefit amount. In step 409, a determination is made as to whether the account is eligible for an additional payment to be made on it by the product or service. Such an example may be a situation where the coverage period for the triggering event exceeds one month and a month has now past since the first payment on the debt of the account was made. In that case, the customer may be eligible to have a second benefit payment made on the account to reduce the debt for a second month. The step described in step 409 may be administered periodically, such as once a month, by the system for each customer account.

If the account is not eligible in step 409, the benefit amount does not change. If the account is eligible in step 409, the process moves to step 413 where the benefit amount for the account of the customer is changed. The benefit amount may change by a previously defined fixed amount due to the occurrence of a period of time, such as the passing of a month. From either of steps 411 or 413, the process proceeds to step 415 where the benefit amount, whether changed in step 413 or not changed in step 411 is maintained. The process may then end at step 417.

In another example, the account of the customer may be eligible to receive an increase in the amount of benefit. A customer may purchase units of benefit amounts for a fixed fee. As such, for a monthly fee of $29.95, a customer may receive a total benefit amount of $3000 in a calendar year and a monthly amount of $500 per triggering event per coverage month. Such a service package may be offered to all customers of an entity. A customer may choose to purchase multiple units of benefit amounts. In one example, a customer may choose to purchase three units. Thus, she would have a monthly fee of $89.85 ($29.95×3 units), a total benefit amount of $9000 in a calendar year, and a monthly amount of $1500 per triggering event per overage month. As should be understood, these are but illustrative examples and other amounts and time periods may be utilized in accordance with one or more aspects of the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. One or more non-transitory computer readable media storing computer executable instructions that, when executed by at least one processor, cause the at least one processor to perform a method comprising:
   maintaining a plurality of accounts associated with a plurality of customers of an entity;
   receiving occurrence data representative of an occurrence of a triggering event associated with a debt cancellation program of the entity;
   receiving customer data representative of a customer associated with the occurrence data, the customer being one of the plurality of customers;
   determining a current benefit amount associated with the customer;
   determining whether the customer is eligible for cancellation of debt associated with an account of the customer;
   upon determining the customer is eligible, determining a current amount of debt in the account of the customer;
   determining whether the current amount of debt in the account of the customer is less than the current benefit amount associated with the customer;
   upon determining the current amount of debt in the account of the customer is less than the current benefit amount associated with the customer, canceling the current amount of debt in the account of the customer to zero; and maintaining a new current benefit amount associated with the customer as the difference between the current benefit amount and the current amount of debt in the account of the customer prior to canceling.

2. The one or more non-transitory computer readable media of claim 1, the method further comprising:

determining whether a new amount of debt in the account of the customer exists; determining whether the customer is eligible for cancellation of the new amount of debt;

upon determining the customer is eligible, determining whether the new amount of debt is less than the new current benefit amount associated with the customer; and upon determining the new amount of debt is less than the new benefit amount associated with the customer, canceling the new amount of debt in the account of the customer to zero.

3. The one or more non-transitory computer readable media of claim 1, the method further comprising:

determining whether the account of the customer is eligible for an increase in the new current benefit amount; and upon determining the account of the customer is eligible, increasing the new current benefit amount associated with the customer.

4. The one or more non-transitory computer readable media of claim 1, wherein the current benefit amount is a default benefit amount for all eligible customers.

5. The one or more non-transitory computer readable media of claim 4, the method further comprising:

periodically determining whether the account of the customer is eligible for an increase in the new current benefit amount; and upon determining the account of the customer is eligible, increasing the new current benefit amount associated with the customer.

6. The one or more non-transitory computer readable media of claim 5, wherein debt in the account of the customer is canceled periodically by the lesser of an amount to reduce the debt to zero and the new current benefit amount.

7. The one or more non-transitory computer readable media of claim 1, the method further comprising:

maintaining event data representative of a plurality of triggering events associated with the debt cancellation program of the entity; and maintaining current benefit amount data representative of current benefit amounts associated with the debt cancellation program for the plurality of customers.

8. The one or more non-transitory computer readable media of claim 7, wherein the event data includes an amount of coverage time for each triggering event.

9. The one or more non-transitory computer readable media of claim 8, wherein the triggering event is involuntary unemployment of the customer and the coverage time for the triggering event is at least one month.

10. The one or more non-transitory computer readable media of claim 1, wherein determining whether the customer is eligible for cancellation of debt associated with an account of the customer includes:

receiving data representative of proof of the occurrence of the triggering event; and validating the received data representative of proof.

11. A system comprising:

at least one database configured to maintain a plurality of accounts associated with a plurality of customers of an entity; and at least one computing device, operatively connected to the at least one database, configured to:

receive occurrence data representative of an occurrence of a triggering event associated with a debt cancellation program of the entity, receive customer data representative of a customer associated with the occurrence data, the customer being one of the plurality of customers, determine a current benefit amount associated with the customer, determine whether the customer is eligible for cancellation of debt associated with an account of the customer, upon determining the customer is eligible, determine a current amount of debt in the account of the customer, determine whether the current amount of debt in the account of the customer is less than the current benefit amount associated with the customer, upon determining the current amount of debt in the account of the customer is less than the current benefit amount associated with the customer, cancel the current amount of debt in the account of the customer to zero, and maintain a new current benefit amount associated with the customer as the difference between the current benefit amount and the current amount of debt in the account of the customer prior to canceling.

12. The system of claim 11, the at least one computing device further configured to:

determine whether a new amount of debt in the account of the customer exists, determine whether the customer is eligible for cancellation of the new amount of debt, upon determining the customer is eligible, determine whether the new amount of debt is less than the new current benefit amount associated with the customer, and upon determining the new amount of debt is less than the new benefit amount associated with the customer, cancel the new amount of debt in the account of the customer to zero.

13. The system of claim 11, the at least one computing device further configured to:

determine whether the account of the customer is eligible for an increase in the new current benefit amount; and upon determining the account of the customer is eligible, increase the new current benefit amount associated with the customer.

14. The system of claim 11, wherein the current benefit amount is a default benefit amount for all eligible customers.

15. The system of claim 14, the at least one computing device further configured to:

periodically determine whether the account of the customer is eligible for an increase in the new current benefit amount; and upon determining the account of the customer is eligible, increase the new current benefit amount associated with the customer.

16. The system of claim 15, wherein debt in the account of the customer is canceled periodically by the lesser of an amount to reduce the debt to zero and the new current benefit amount.

17. The system of claim 11, the at least one computing device further configured to:
- maintain event data representative of a plurality of triggering events associated with the debt cancellation program of the entity; and
- maintain current benefit amount data representative of current benefit amounts associated with the debt cancellation program for the plurality of customers.

18. The system of claim 17, wherein the event data includes an amount of coverage time for each triggering event.

19. The system of claim 18, wherein the triggering event is involuntary unemployment of the customer and the coverage time for the triggering event is at least one month.

20. The system of claim 11, wherein the at least one computing device configured to determine whether the customer is eligible for cancellation of debt associated with an account of the customer includes the at least one computing device configured to:
- receive data representative of proof of the occurrence of the triggering event; and
- validate the received data representative of proof.

21. One or more non-transitory computer readable media storing computer executable instructions that, when executed by at least one processor, cause the at least one processor to perform a method comprising:
- maintaining a starting benefit amount of a debt cancellation program associated with an account of a customer;
- canceling a starting amount of debt in the account of the customer to a zero balance;
- maintaining a new benefit amount associated with the account of the customer as the difference between the starting benefit amount and the starting amount of debt;
- determining whether a new amount of debt in the account of the customer exists; and
- canceling the new amount of debt in the account of the customer by the new benefit amount.

22. The one or more non-transitory computer readable media of claim 21, further comprising determining the starting benefit amount based upon a number of units of benefit amounts purchased by the customer.

23. The one or more non-transitory computer readable media of claim 21, wherein the starting benefit amount is based upon a childbirth event associated with the customer.

24. One or more non-transitory computer readable media storing computer executable instructions that, when executed by at least one processor, cause the at least one processor to perform a method comprising:
- maintaining a plurality of accounts associated with a plurality of customers of an entity;
- receiving first occurrence data representative of an occurrence of a first triggering event associated with a debt cancellation program of the entity;
- receiving second occurrence data representative of an occurrence of a second triggering event associated with the debt cancellation program of the entity;
- receiving customer data representative of a customer associated with the first occurrence data and the second occurrence data, the customer being one of the plurality of customers;
- determining a first current benefit amount associated with the customer for the occurrence of the first triggering event;
- determining a second current benefit amount associated with the customer for the occurrence of the second triggering event;
- determining whether the customer is eligible for cancellation of debt associated with an account of the customer based upon at least one of: the first occurrence data and the second occurrence data;
- upon determining the customer is eligible, determining a current amount of debt in the account of the customer;
- determining whether the current amount of debt in the account of the customer is less than the first current benefit amount associated with the customer;
- upon determining the current amount of debt in the account of the customer is not less than the first current benefit amount associated with the customer, canceling the current amount of debt in the account of the customer by the first current benefit amount;
- maintaining a new amount of debt in the account of the customer as the difference between the current amount of debt in the account of the customer and the first current benefit amount;
- determining whether the new amount of debt in the account of the customer is less than the second current benefit amount associated with the customer;
- upon determining the new amount of debt in the account of the customer is less than the second current benefit amount associated with the customer, canceling the new amount of debt in the account of the customer to zero; and
- maintaining a new current benefit amount associated with the customer as the difference between the second current benefit amount and the new amount of debt in the account of the customer prior to canceling the new amount of debt in the account of the customer to zero.

* * * * *